(12) United States Patent
Tominaga et al.

(10) Patent No.: US 6,930,315 B2
(45) Date of Patent: Aug. 16, 2005

(54) METHOD AND APPARATUS FOR IRRADIATION OF ACTIVE ENERGY BEAM

(75) Inventors: Hiroshi Tominaga, Tokyo (JP); Akihiko Kizaki, Tokyo (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/794,672

(22) Filed: Mar. 5, 2004

(65) Prior Publication Data

US 2004/0178363 A1 Sep. 16, 2004

Related U.S. Application Data

(62) Division of application No. 09/857,367, filed as application No. PCT/JP00/07052 on Oct. 11, 2000, now Pat. No. 6,727,508.

(30) Foreign Application Priority Data

Oct. 12, 1999 (JP) .............................. 11-288934
Sep. 25, 2000 (JP) ........................ 2000-289726

(51) Int. Cl.⁷ ................................................ F26B 21/00
(52) U.S. Cl. .................................. 250/492.1; 118/50.1
(58) Field of Search ........................... 250/492.1–492.3; 34/276; 118/50.1, 718, 719

(56) References Cited

U.S. PATENT DOCUMENTS

| 2,887,584 A | | 5/1959 | Nygard |
| 2,972,330 A | * | 2/1961 | Bugbee ........................ 118/718 |
| 2,989,026 A | * | 6/1961 | Gardner et al. .............. 118/718 |
| 3,654,459 A | | 4/1972 | Coleman |
| 3,807,052 A | | 4/1974 | Troue |
| 3,936,950 A | | 2/1976 | Troue |
| 4,118,873 A | | 10/1978 | Rothchild |
| 4,252,413 A | | 2/1981 | Nablo |
| 4,497,250 A | * | 2/1985 | Dressler ................... 101/350.5 |

FOREIGN PATENT DOCUMENTS

| EP | 0 330 705 A1 | 9/1989 | |
| EP | 816073 A1 * | 1/1998 | ........... B41F/16/00 |
| JP | 48-86930 | 11/1973 | |
| JP | 50-83435 A | 7/1975 | |
| JP | 60-90762 A | 5/1985 | |
| JP | 60-140641 U | 9/1985 | |
| JP | 50-60899 A | 3/1993 | |
| JP | 49-120937 A | 12/1993 | |
| JP | 9-138300 A | 5/1997 | |
| JP | 10-156177 A | 6/1998 | |
| JP | 2000-9900 A | 1/2000 | |

* cited by examiner

*Primary Examiner*—Lamson Nguyen
*Assistant Examiner*—Blaise Mouttet
(74) *Attorney, Agent, or Firm*—Frishauf, Holtz, Goodman & Chick, P.C.

(57) ABSTRACT

A target object to be irradiated is transported into an irradiating chamber through a transport inlet for irradiation with an active energy beam under an inert gas atmosphere in an active energy beam irradiating section included in the irradiating chamber and, then is transported out of the irradiating chamber. When the object is subject to above steps, the gas flow resistance at the transport outlet is controlled such that the active energy beam irradiation is carried out under the condition of $X/Y \geq 1$, where X represents the gas amount passing through the transport inlet, and Y represents the gas amount passing through the transport outlet.

10 Claims, 9 Drawing Sheets

METHOD AND APPARATUS FOR IRRADIATION OF ACTIVE ENERGY BEAM

CROSS-REFERENCE TO RELATED APPLICATIONS

The present application is a Divisional of U.S. application Ser. No. 09/857,367 filed Jun. 4, 2001 now U.S. Pat. No. 6,727,508, which is a U.S. National Phase Application under 35 USC 371 of International Application PCT/JP00/07052 (not published in English) filed Oct. 11, 2000.

TECHNICAL FIELD

The present invention relates to a method and apparatus for irradiating an object with an active energy beam in the case of requiring an inert gas or reactive gas atmosphere in the irradiation treatment within an active energy beam irradiating chamber.

BACKGROUND ART

A paint, a printing ink, an adhesive, etc., which are cured by irradiation with an active energy beam such as an electron beam or an ultraviolet light are advantageous over the conventional paint, printing ink, adhesive, etc., which are thermally cured and dried, in that the process speed can be increased, that an environmental problem is not generated because a solvent is not used, and that the energy beam irradiation apparatus can be miniaturized, and, thus, have come to be put to a practical use. In the active energy beam irradiation, the irradiation is carried out in many cases under an inert gas atmosphere, and the irradiation under a reactive gas is also being studied. The irradiation under the inert gas atmosphere will now be described mainly in the following.

Some of the paints, printing inks, adhesives, etc. are subject to a curing inhibition caused by oxygen and fail to be cured unless the irradiation is carried out under an inert gas atmosphere such as a nitrogen gas atmosphere. In such a case, it is necessary to supply an inert gas into the irradiating chamber so as to substitute the inert gas in the irradiating chamber for carrying out the active energy beam irradiation. However, where the object to be irradiated is continuous such as a web, it is impossible to close the object transport inlet and outlet, with the result that the amount of the air entering the irradiating chamber together with the web is increased with increase in the processing speed so as to lower the purity of the inert gas atmosphere within the irradiating chamber. As a result, it is unavoidable to increase the amount of the inert gas used, resulting in a serious problem such as an increase in the running cost.

A measure for overcoming the above-noted problem is proposed in, for example, Japanese Patent Disclosure (Kokai) No. 48-86930. It is proposed that the transport outlet of the irradiating chamber of the object is closed by a nip roll or the like, that an inert gas spurting device and a plurality of partitioned chambers are arranged in the transport inlet, and that a gas discharge pipe is arranged in each of the partitioned chambers so as to prevent the air intrusion. It is taught that the particular technique permits lowering the oxygen concentration within the irradiating chamber to several percent or less.

Another measure is proposed in Japanese Patent Disclosure No. 5-60899. It is proposed that a plurality of nozzles for blowing an inert gas against the surface of the target object to be irradiated and a transport duct covering at least partially the roll for guiding the transport of the target object are arranged along the transport passageway of the target object. It is taught that the particular technique permits increasing the utilization rate of the inert gas for forming an inert gas atmosphere in the irradiating region.

Another measure is proposed in Japanese Patent Disclosure No. 60-90762. It is proposed that an inert gas supply section is arranged within the irradiating chamber having the transport inlet sealed with a cylinder of a printing machine and the transport outlet sealed with a pair of rolls, and that a gas discharge section is arranged in the vicinity of the irradiating chamber. It is taught that the particular technique permits decreasing the amount of the inert gas used and also permits a high speed processing.

A still another measure is proposed in Japanese Patent Disclosure No. 9-138300. It is proposed that a transport roll is arranged in the transport inlet so as to narrow the opening, thereby suppressing the supply of the inert gas. It is also taught that it is possible to prevent the fluttering generated along the flow of the target object that is transported continuously.

In the conventional constructions described above, however, it is necessary supply the inert gas to the inert gas spurting nozzles arranged on one or both sides of the irradiating chamber as well as into the irradiating chamber, leading to an increase in the total amount of the inert gas used.

In the case of arranging a gas discharge pipe, it is necessary to control appropriately the atmosphere within the irradiating chamber. However, it is difficult to have the supply amount of the inert gas and the gas discharge amount balanced. Where the supply amount and the discharge amount are markedly unbalanced, a problem is generated that the amount of the inert gas used is increased. Also, where the inert gas having a high flowing speed is spurted from the inert gas spurting nozzle, a negative pressure is established in the vicinity of the nozzle so as to suck the air from the transport inlet and outlet and from the clearance around the irradiating chamber, giving rise to the problem that the oxygen concentration is not lowered to a desired level. In addition, in the apparatus in which a cover is not mounted to the roll, the inert gas leakage takes place in a large amount.

Further, if the inert gas supply section and the gas discharge section are arranged and, particularly, made integral with a printing machine, or if a partitioned chamber is arranged in front of the irradiating chamber, the entire apparatus is rendered bulky. Naturally, the inner volume of the apparatus is increased, resulting in failure to decrease the amount of the inert gas used. Where the transport inlet is sealed by the cylinder of a printing machine, it is necessary to arrange the printing machine and the active energy beam irradiating apparatus as a set. However, it is practically difficult to add an active energy beam irradiating apparatus to the printing machine arranged in advance.

What should be noted is that, in the conventional active energy beam irradiating method and apparatus, measures are certainly taken to increase the gas flow resistance. However, the conventional apparatus and method are irrelevant to the concept of controlling the amount of the gas passing through the transport inlet and outlet. Where the balance of the gas flow resistance is poor, the amount of the inert gas used for forming the inert gas atmosphere was possibly increased.

It should also be noted that, where the atmosphere within the irradiating chamber is held at a negative pressure, the air is sucked in, for example, from the transport inlet and outlet and from the clearance around the irradiating chamber, resulting in failure to substitute an inert gas within the irradiating chamber. In other words, the oxygen concentration within the irradiating chamber fails to be lowered to a desired level.

DISCLOSURE OF THE INVENTION

An object of the present invention is to provide a method and apparatus for the active energy beam irradiation, which permit substituting a gas effectively within the irradiating chamber in performing the active energy beam irradiation.

Another object is to provide a transport duct used in such an active energy beam irradiation apparatus.

Still another object of the present invention is to provide a method and apparatus for an active energy beam irradiation, which permit stably maintaining the atmosphere within the irradiating chamber.

As a result of an extensive research conducted in an attempt to achieve the above-noted objects, the present inventors have found that, in order to substitute a substituting gas within an irradiating chamber while suppressing the amount of the substituting gas, e.g., for suppressing stably the oxygen concentration within the irradiating chamber to a low level while decreasing the amount of the inert gas used, in a transport system for transporting a target object to be irradiated into an irradiating chamber or in a transport system for substantially continuously transporting the target object into the irradiating chamber, it is effective to introduce a substituting gas, e.g., an inert gas, into the active energy beam irradiating chamber and to make the gas flow resistance at the transport outlet equal to or higher than the gas flow resistance in the transport inlet, and that it is particularly effective to make the gas flow resistance in the transport outlet higher than that in the transport inlet.

It has also been found that, in the apparatus capable of achieving the objects described above, it is effective to use ducts given below as means for generating a flow resistance of an inert gas or a reactive gas in the transport inlet and/or the transport outlet:

1. A transport duct including a transport roll and a roll cover covering at least a part of the transport roll, both arranged on one side of any of the front surface and the back surface of a target object to be irradiated, which passes through the transport duct, and at least one partition wall arranged on the other side.

2. A transport duct including a transport roll and a roll cover covering at least a part of the transport roll, both arranged on one side of any of the front surface and the back surface of a target object to be irradiated, which passes through the transport duct, and a cover shaped to conform with the shape of the transport roll and constructed to cover the target object and the transport roll, which is arranged on the other side.

3. A transport duct including a transport roll and a roll cover covering at least a part of the transport roll, both arranged on one side of any of the front surface and the back surface of a target object to be irradiated, which passes through the transport duct, as well as a nip roll and a roll cover covering the nip roll, which are arranged on the other side.

It has been found that it is possible to effectively control the gas flow resistance and to shield effectively the active energy beam by using at least one of the ducts 1, 2 and 3 given above, while the apparatus is compact. By using the duct of the particular construction, it is possible to maintain the oxygen concentration within the irradiating chamber at a low level with a high stability while decreasing the amount of the inert gas used, compared with the prior art, and to shield the active energy beam such as an X-ray within its own casing.

The term "gas flow resistance" implies the flow resistance against the gas. The gas flow is obstructed with increase in the flow resistance.

The present inventors have conducted additional experiments and found that, where a target object to be irradiated is transported into an irradiating chamber at a certain transport speed, it is effective to set up the pressure within the irradiating chamber higher than the pressure outside the irradiating chamber, i.e., the atmospheric pressure in general, in order to stabilize the atmosphere within the irradiating chamber (e.g., in order to maintain a stable inert gas atmosphere having a low oxygen concentration within the irradiating chamber). In other words, it is effective for the differential pressure between the pressure inside the irradiating chamber and the atmospheric pressure to be a positive pressure. It has also been found that it is effective for the differential pressure to be constant.

The present invention has been achieved on the basis of the findings described above.

According to a first aspect of the present invention, there is provided a method for an active energy beam irradiation, the method comprising transporting a target object to be irradiated through a transport inlet of an irradiating chamber for performing an active energy beam irradiation into said irradiating chamber, irradiating the object with an active energy beam in an active energy beam irradiating section under an inert gas or a reactive gas atmosphere, and transporting the object out of the irradiating chamber through a transport outlet of the irradiating chamber, wherein the gas flow resistance at each of the transport inlet and the transport outlet is controlled to meet the condition of $X/Y \geq 1$, where X represents the amount of the gas passing through the transport inlet, and Y represents the amount of the gas passing through the transport outlet, and the active energy beam irradiation is carried out under the state meeting the condition of $X/Y \geq 1$.

According to a second aspect of the present invention, there is provided an apparatus for an active energy beam irradiation, comprising an irradiating chamber for irradiating a target object with an active energy beam, said irradiating chamber including a transport inlet for transporting said target object into said irradiating chamber and a transport outlet for transporting said target object out of the irradiating chamber; an irradiating apparatus for irradiating said target object with an active energy beam within said irradiating chamber; and a gas supply mechanism for supplying an inert gas or a reactive gas into said irradiating chamber thereby to set up an inert gas atmosphere or a reactive gas atmosphere within the irradiating chamber, wherein said irradiating chamber includes an irradiating section for irradiating the target object with the active energy beam emitted from said irradiating apparatus and a transport duct having a gas flow resistor serving to set up the condition of $X/Y \geq 1$, where X represents the gas amount passing through said transport inlet and Y represents the gas amount passing through said transport outlet.

According to the constructions defined in the present invention, it is possible to replace the air within the irradiating chamber by decreasing the amount of the substituting gas used, compared with the prior art. In the case of supplying an inert gas., it is possible to maintain the oxygen concentration within the irradiating chamber at a low level with a high stability while decreasing the amount of the inert gas used, compared with the prior art.

Particularly, where the active energy beam irradiation is carried out under the condition of X/Y>1, the air within the irradiating chamber can be replaced with a smaller amount of the substituting gas used even where the transport speed of the target object is high.

According to a third aspect of the present invention, there is provided an apparatus for an active energy beam irradiation, comprising an irradiating chamber including a transport inlet for transporting said target object into said irradiating chamber and a transport outlet for transporting said target object out of the irradiating chamber; an irradiating apparatus for irradiating said target object with an active energy beam within said irradiating chamber; and a gas supply mechanism for supplying an inert gas or a reactive gas into said irradiating chamber thereby to set up an inert gas atmosphere or a reactive gas atmosphere within the irradiating chamber, wherein said irradiating chamber includes an irradiating section for irradiating the target object with the active energy beam emitted from said irradiating apparatus, a transport duct arranged on the side of said transport inlet, and a transport duct arranged on the side of said transport outlet, the gas flow resistance of the transport duct on the side of the transport outlet being equal to or higher than the gas flow resistance of the transport duct on the side of the transport inlet.

The particular construction defined in the third aspect described above permits replacing the air within the irradiating chamber with a smaller amount of the substituting gas used.

According to a fourth aspect of the present invention, there is provided an apparatus for an active energy beam irradiation, comprising an irradiating chamber including a transport inlet for transporting said target object into said irradiating chamber and a transport outlet for transporting said target object out of the irradiating chamber; an irradiating apparatus for irradiating said target object with an active energy beam within said irradiating chamber; and a gas supply mechanism for supplying an inert gas or a reactive gas into said irradiating chamber thereby to set up an inert gas atmosphere or a reactive gas atmosphere within the irradiating chamber, wherein said irradiating chamber includes an irradiating section for irradiating the target object with the active energy beam emitted from said irradiating apparatus, a transport duct arranged on the side of said transport inlet, and a transport duct arranged on the side of said transport outlet, and wherein said transport duct on the side of the transport inlet includes a transport roll and a roll cover covering at least partially said transport roll, both arranged on one side of any of the front surface and the back surface of the target object passing through said transport duct, and includes a gas flow resistor arranged on the other side and having at least one partition wall or a cover arranged to conform with the shape of said transport roll and constructed to cover the target object and the transport roll; said transport duct on the side of the transport outlet includes a transport roll and a roll cover covering at least partially said transport roll, both arranged on one side of any of the front surface and the back surface of the target object passing through said transport duct, and includes a gas flow resistor arranged on the other side and having a nip roll and a nip roll cover covering said nip roll; and the gas flow resistance of the transport duct on the side of the transport outlet is higher than the gas flow resistance of the transport duct on the side of the transport inlet.

According to a fifth aspect of the present invention, there is provided a transport duct for an apparatus for an active energy beam irradiation, comprising a transport roll and a roll cover covering at least partially said transport roll, both arranged on one side of any of the front surface and the back surface of a target object passing through said transport duct, and a gas flow resistor arranged on the other side and having at least one partition wall.

According to a sixth aspect of the present invention, there is provided a transport duct for an apparatus for an active energy beam irradiation, comprising a transport roll and a roll cover covering at least partially said transport roll, both arranged on one side of any of the front surface and the back surface of a target object passing through said transport duct, and a gas flow resistor arranged on the other side and having a cover shaped to conform with the shape of the transport roll and constructed to cover the target object and the transport roll.

The transport duct according to the fifth and sixth aspects of the present invention is free from the contact of the target object with its surrounding structure by fluttering of the target object so as to make it possible to control strictly the gas flow resistance. In addition, it is possible to shield the active energy beam such as an X-ray. It follows that the particular transport duct permits providing a small active energy beam irradiating apparatus.

According to a seventh aspect of the present invention, there is provided a transport duct for an apparatus for an active energy beam irradiation, comprising a transport roll and a roll cover covering at least partially said transport roll, both arranged on one side of any of the front surface and the back surface of a target object passing through said transport duct, and a gas flow resistor arranged on the other side and having a nip roll and a roll cover covering said nip roll.

The transport duct according to the seventh aspect of the present invention permits strictly controlling the gas flow resistance, permits shielding the active energy beam such as an X-ray, and further permits providing a small active energy irradiating apparatus. In this case, it is possible to shield more effectively the active energy beam such as an X-ray by arranging a pair of nip rolls in a position deviated from the line along which the target object is transported within the irradiating chamber thereby obstructing the straight passageway of the active energy beam such as an X-ray.

According to an eighth aspect of the present invention, there is provided a method for an active energy beam irradiation, in which an inert gas or a reactive gas is introduced into an irradiating chamber for irradiating an active energy beam thereby to set up an inert gas atmosphere or a reactive gas atmosphere within the irradiating chamber, a target object to be irradiated is introduced into said irradiating chamber through a transport inlet of the irradiating chamber for irradiation with the active energy beam in an active energy irradiating section of the irradiating chamber and, then, the target object is transported out of the irradiating chamber through a transport outlet, wherein the pressures both inside and outside the irradiating chamber are measured and the supply of the inert gas or the reactive gas into the irradiating chamber is controlled on the basis of the differential pressure between the pressure inside the irradiating chamber and the pressure outside the irradiating chamber.

According to a ninth aspect of the present invention, there is provided a method for an active energy beam irradiation, in which an inert gas or a reactive gas is introduced into an irradiating chamber for irradiating an active energy beam thereby to set up an inert gas atmosphere or a reactive gas atmosphere within the irradiating chamber, a target object to be irradiated is introduced into said irradiating chamber through a transport inlet of the irradiating chamber for irradiation with the active energy beam in an active energy irradiating section of the irradiating chamber and, then, the target object is transported out of the irradiating chamber through a transport outlet, wherein the pressures both inside and outside the irradiating chamber are measured and the size of the opening in the transport inlet and/or the transport outlet is controlled on the basis of the differential pressure between the pressure inside the irradiating chamber and the pressure outside the irradiating chamber.

According to a tenth aspect of the present invention, there is provided an apparatus for an active energy beam irradiation, comprising an irradiating chamber for irradiating a target object with an active energy beam including a transport inlet for transporting said target object into the irradiating chamber and a transport outlet for transporting the target object out of the irradiating chamber; an irradiating apparatus for irradiating the target object with the active energy beam within said irradiating chamber; a transport mechanism for transporting the target object; a gas supply mechanism for supplying an inert gas or a reactive gas into the irradiating chamber; a differential pressure measuring apparatus for measuring the differential pressure between the pressure inside the irradiating chamber and the pressure outside the irradiating chamber; and a control mechanism for controlling at least one of (a) the supply of the inert gas, (b) the size of the opening in the transport inlet and/or the transport outlet, and (c) the transport speed of the target object, on the basis of the differential pressure measured by said differential pressure measuring apparatus.

According to an eleventh aspect of the present invention, there is provided an apparatus for an active energy beam irradiation, comprising an irradiating chamber for irradiating a target object with an active energy beam including a transport inlet for transporting said target object into the irradiating chamber and a transport outlet for transporting the target object out of the irradiating chamber; an irradiating apparatus for irradiating the target object with the active energy beam within said irradiating chamber; a transport mechanism for transporting the target object; a gas supply mechanism for supplying an inert gas or a reactive gas into the irradiating chamber; a differential pressure measuring apparatus for measuring the differential pressure between the pressure inside the irradiating chamber and the pressure outside the irradiating chamber; a supply amount control mechanism for controlling the supply amount of the inert gas or the reactive gas; an opening control mechanism for controlling the size of the opening of the transport inlet and/or the transport outlet; and a speed control mechanism for controlling the transport speed of the target object, wherein at least one of said supply amount control mechanism, the opening control mechanism, and the speed control mechanism is controlled on the basis of the differential pressure measured by said differential pressure measuring apparatus.

The active energy beam irradiating apparatus according to the eighth to eleventh aspects of the present invention permits stably maintaining the atmosphere, e.g., the inert gas atmosphere, within the irradiating chamber, by measuring the differential pressure between the pressure inside the irradiating chamber and the pressure outside the irradiating chamber. What should also be noted is that, since the inert gas atmosphere can be controlled by a simple and cheap fine differential pressure gage in place of the conventional oxygen densitometer, the apparatus cost can be reduced.

BEST MODE OF WORKING THE INVENTION

Some embodiments of the present invention will now be described in detail with reference to the accompanying drawings.

(First Embodiment)

Figure 1:
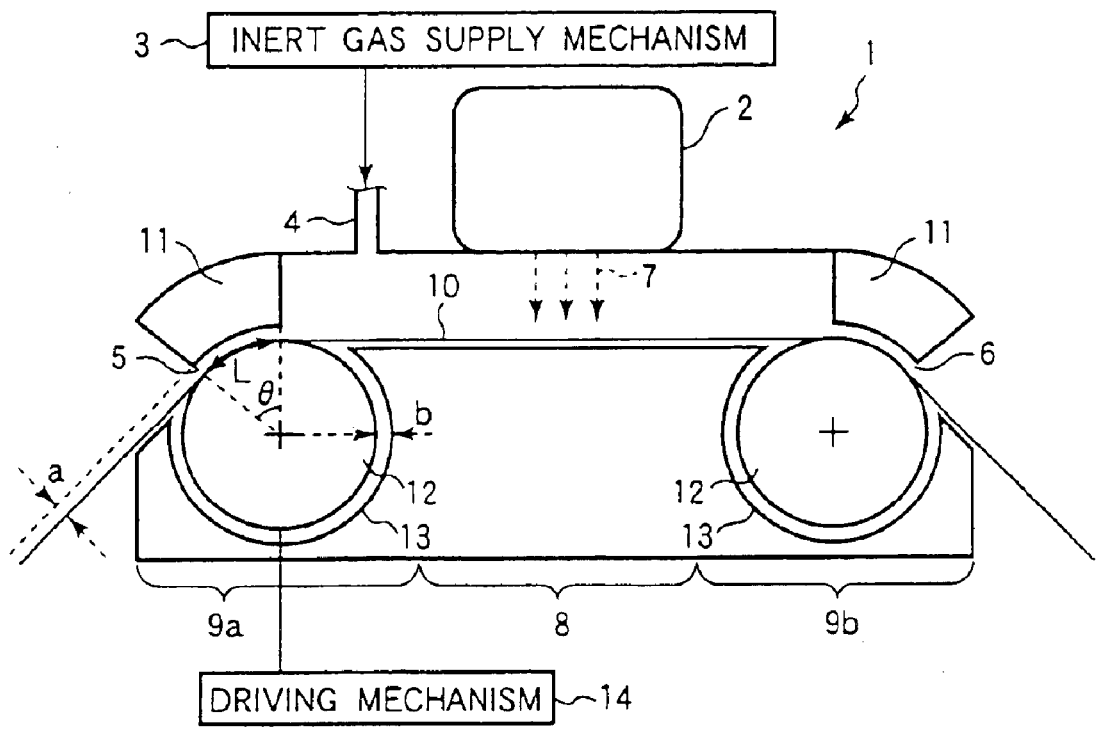
FIG. 1 is a cross sectional view schematically showing the construction of an active energy beam irradiating apparatus according to a first embodiment of the present invention.

FIG. 1 is a cross sectional view schematically showing an active energy beam irradiating apparatus according to a first embodiment of the present invention. As shown in the drawing, the active energy beam irradiation apparatus comprises an irradiating chamber 1 for irradiating a target object to be irradiated an active energy beam, an irradiating unit (irradiating apparatus) 2 for irradiating a target object 10 with an active energy beam within the irradiating chamber 1, and an inert gas supply mechanism 3 for supplying an inert gas into the irradiating chamber 1 through an inert gas supply pipe 4.

The irradiating chamber 1 is provided with a transport inlet 5 for continuously transporting the target object 10 into the irradiating chamber 1, a transport outlet 6 for continuously transporting the target object 10 from within the irradiating chamber 1, an irradiating section 8 for irradiating the target object 10 with an active energy beam 7 emitted from the irradiating unit 2, a transport duct 9a on the side of the transport inlet 5, and a transport duct 9b on the side of the transport outlet 6.

Each of the transport ducts 9a and 9b comprises a gas flow resistor 11 for controlling the flowing resistance of the gas, a transport roll 12 for transporting the target object 10, and a roll cover 13 covering the transport roll 12. It is possible for the transport roll 12 on one side (on the side of the transport inlet in the drawing) to be driven by a driving mechanism 14.

Figure 2:
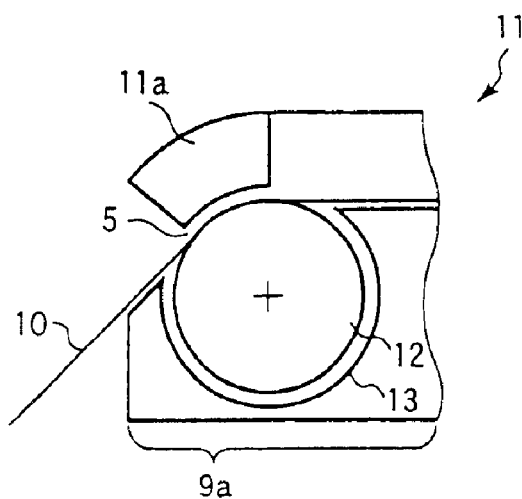
FIG. 2 is a cross sectional view schematically showing as an example the construction of a transport duct used in an active energy beam irradiating apparatus.
Figure 3:
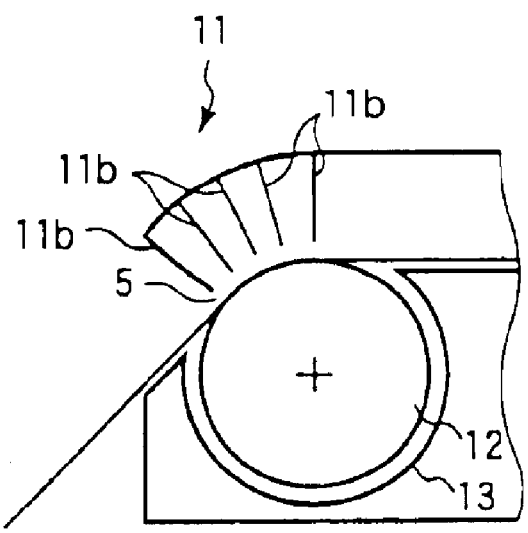
FIG. 3 is a cross sectional view schematically showing as another example the construction of a transport duct used in an active energy beam irradiating apparatus.

It is desirable for the gas flow resistor to be constructed such that a cover structure 11a is arranged to cover partly the transport roll 12 as shown in FIG. 2, or at least one, preferably, at least three partition walls 11b are arranged on the transport roll 12 as shown in FIG. 3. Incidentally, the partition wall is a structure or a device for increasing the flow resistance of the gas and, thus, substantially prevents the gas flow. In other words, the partition wall resists the passage of the gas and, thus, substantially shields the gas communication with the outside.

In the case of employing the above-mentioned construction, it is possible to obtain an optional gas flow resistance by controlling the clearance "a" shown in FIG. 1 between the gas flow resistor 11 and the transport roll 12 or the distance L along which the clearance "a" is formed, or where the gas flow resistor 11 is formed of the partition walls 11b, by controlling the number of partition walls 11b. In other words, the gas flow resistance can be controlled by appropriately controlling at least one of the clearance "a", the distance L, and the number of partition walls.

It is possible to obtain a ratio of the gas flow resistance by measuring the flow rate of the gas passing through the transport ducts 9a, 9b arranged in the transport inlet 5 and outlet port 6. To be more specific, the inert gas supplied from the inert gas supply mechanism 3 into the irradiating chamber 1 through the inert gas supply pipe 4 is distributed within the irradiating chamber 1 at a specified ratio to the inert gas discharged on the side of the transport inlet 5 and to the inert gas discharged on the side of the transport outlet 6 by the gas flow resistance of the individual gas flow resistors 11 arranged in the transport ducts 9a, 9b in the transport inlet 5 and the outlet 6, respectively. It should be noted that the distributing ratio C is represented by: C=X/Y, where X represents the flow rate (L/min) of the inert gas discharged on the side of the transport inlet 5, and Y represents the flow rate (L/min) of the inert gas discharged on the side of the transport outlet 6.

In this embodiment, the distributing ratio C is set at 1 or more. As a result, it is possible to utilize efficiently the inert gas for the gas substitution within the irradiating chamber 1, making it possible to provide a high purity inert gas atmosphere with a high stability by using a small amount of the inert gas. It is desirable for the distributing ratio C to be larger than 1. In this case, even if the target object 10 is transported at a high speed, it is possible to provide a high purity inert gas atmosphere with a high stability by using smaller amount of the inert gas. It is more desirable for the distributing ratio C to be at least 1.5.

Incidentally, the distributing ratio C represents the ratio of the amounts of the gases passing through the transport ducts 9a and 9b and, thus, the gas discharged from the other gas discharge mechanism mounted to the irradiating unit 2 for irradiating the active energy beam is not limited at all.

It is possible to design appropriately the clearance "a" between the gas flow resistor 11 and the transport roll 12 in view of, for example, the thickness of the target object to be irradiated. It should be noted, however, that, if the clearance "a" is unduly large, it is difficult to obtain a gas flow resistance high enough to keep the irradiating section 8 within the inert gas atmosphere. Such being the situation, it is desirable for the clearance "a" to be not larger than 5 mm, more preferably, not larger than 2 mm, from the surface of the target object.

It is necessary to design the gas flow resistor 11 such that the active energy beam emitted from the irradiating unit 2 or an active energy beam such as an X-ray secondarily generated by the active energy beam irradiation does not leak through the gas flow resistor 11. In other words, the gas flow resistor 11 is required to perform the shielding function of the active energy beam or the active energy beam secondarily generated by the active energy beam irradiation.

Under the circumstances, an angle $\theta$ at which the gas flow resistor 11 covers the transport roll 12 is defined. It is necessary to design the angle $\theta$ in view of the allowance of the transport line. In general, the angle $\theta$ should desirably be at least 5°, more preferably at least 15°, in order to prevent the active energy beam from leaking linearly from within the irradiating chamber to the outside. Further, the material and the thickness of the gas flow resistor 11 are set appropriately so as to prevent the active energy beam from passing though the gas flow resistor 11.

The roll cover 13 is mounted to cover the transport roll 12 so as to prevent the outer air from entering the irradiating chamber. Therefore, it is desirable to set the clearance b between the transport roll 12 and the roll cover 13 as small as possible. Specifically, the clearance b should be set at 2 mm or less, more preferably 1 mm or less. Also, it is desirable for the roll cover 13 to cover the outer circumferential surface of the roll 12 as much as possible. To be more specific, it is desirable for the roll cover 13 to cover at least ⅓, more preferably at least ½, of the outer circumferential surface of the roll 12.

Fluttering of the target object 10 to be irradiated is suppressed by the transport roll 12 within the transport duct, and it is possible to avoid the contact of the printed surface with the duct. Also, the target object 10 makes it possible to set strictly the clearance between the gas flow resistor 11 and the transport roll 12.

Figure 4:
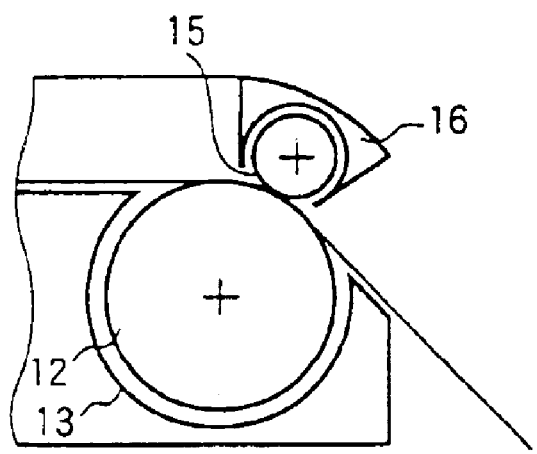
FIG. 4 is a cross sectional view schematically showing as still another example the construction of a transport duct used in an active energy beam irradiating apparatus.
Figure 5:
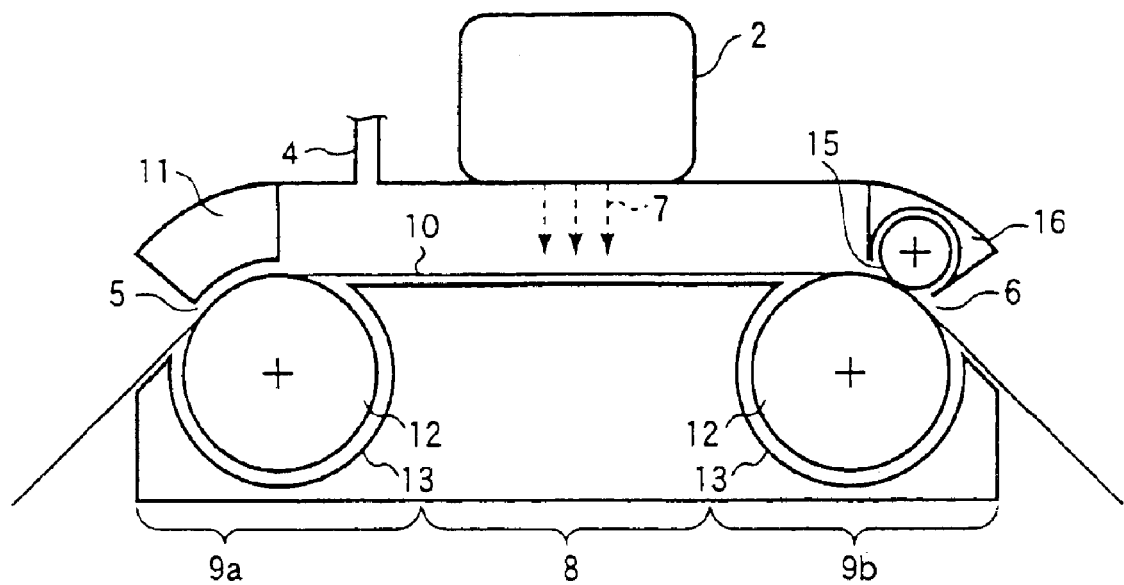
FIG. 5 is a cross sectional view schematically showing as another example the construction of an active energy beam irradiating apparatus according to the first embodiment of the present invention.

It is possible to use a nip roll 15 as shown in FIG. 4 as the gas flow resistor. It is desirable to mount a roll cover 16 in a manner to cover the nip roll, in this case, too. Since the gas flow resistance is increased by the use of the nip roll 15, it is possible to make the distributing ratio C referred to previously higher than 1 easily by mounting the nip roll 15 as a gas flow resistor of the transport duct 9b on the side of the transport outlet 6 and by mounting the cover structure 11a or the partition walls 11b as the gas flow resistor 11 of the transport duct 9a on the side of the transport inlet 5, as shown in FIG. 5.

Figure 6:
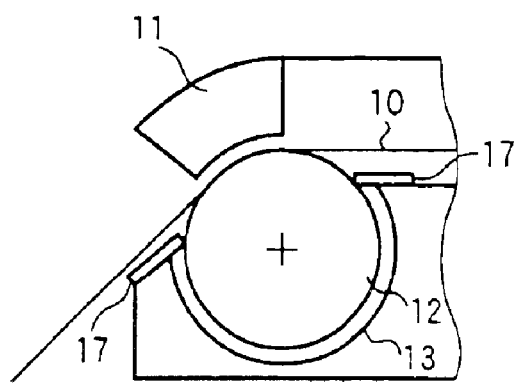
FIG. 6 is a cross sectional view schematically showing as another example the construction of a transport duct used in an active energy beam irradiating apparatus.

It is also effective to arrange a doctor 17 between the transport roll 12 and the roll cover 13 as shown in FIG. 6 so as to physically shield the gas flow. It is possible to use at least one of a plastic material, a rubber and a metal or a combination of at least two of these materials for forming the doctor 17. Incidentally, it is also possible to arrange the doctor between the nip roll 15 and the roll cover 16 shown in FIG. 4.

The active energy beam 7 emitted from the irradiating unit 2 includes, for example, an electron beam, an ultraviolet light, a γ-ray, an X-ray, and a neutron ray. It is desirable for the active energy beam 7 to be an electron beam requiring an inert gas in many cases. Also, where the target object is intended to be cured, crosslinked or modified upon irradiation with the active energy beam, i.e., where the target object consists of a paper sheet, a metal sheet or a plastic film or sheet coated with, for example, a printing ink, a paint or an adhesive, it is practical for the target object to be irradiated with an electron beam and/or an ultraviolet light in terms of the output of the power and the operability.

It is desirable to use an electron beam irradiating apparatus having a low accelerating voltage, e.g., 100 kV or less., or an irradiating apparatus having a vacuum tube type electron beam irradiating section. The vacuum tube type electron beam irradiating section comprises a cylindrical vacuum vessel made of glass or a ceramic material, an electron beam generating section arranged within the vacuum vessel and serving to take out the electrons emitted from the cathode as an electron beam and for accelerating the electron beam, and an electron beam emitting section mounted to an edge portion of the vacuum vessel and serving to emit an electron beam. The particular electron beam irradiating section is disclosed in U.S. Pat. No. 5,414,267.

An inert gas is supplied into the irradiating chamber 1 through the inert gas supply pipe 4. Where an inert gas is used for the cooling of an electron beam transmitting window as in the ordinary electron beam irradiating apparatus, it is also possible to use the pipe 4 as the inert gas supply pipe.

The inert gas used in the present invention represents a gas that does not perform easily a chemical reaction such as a nitrogen gas, a carbon dioxide gas, a helium gas or an argon gas. In practice, a nitrogen gas or a carbon dioxide gas is used in the present invention as the inert gas. It is also possible to use as the inert gas a mixed gas of oxygen and an inert gas having an oxygen concentration lower than that of the air. A spurting nozzle can be used singly or in combination with another mechanism as the supply mechanism of the inert gas.

The drawings show that only one surface of the target object is irradiated with an active energy beam. However, it is possible for the both surfaces to be irradiated with active energy beam.

(Second Embodiment)

Figure 7:
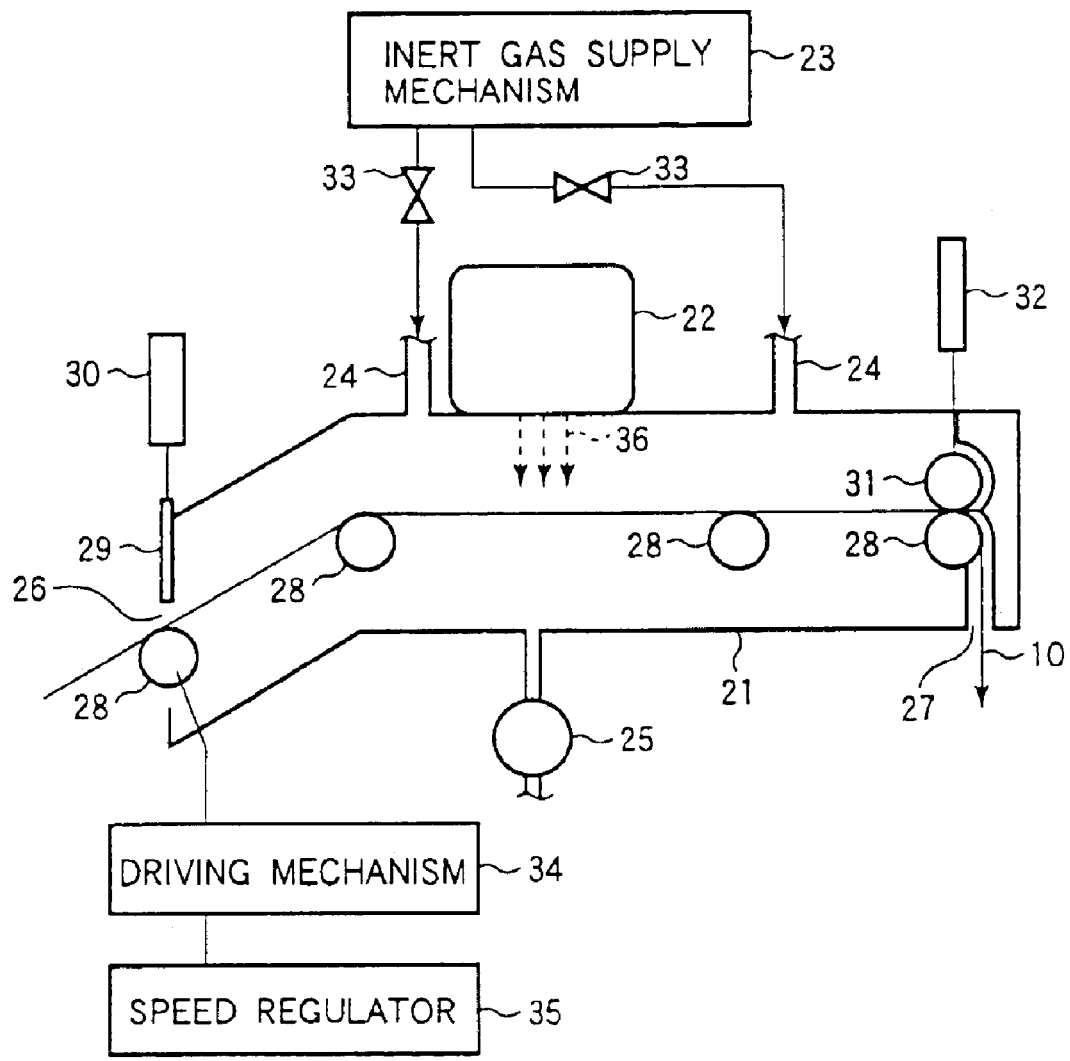
FIG. 7 is a cross sectional view schematically showing as an example the construction of an active energy beam irradiating apparatus according to a second embodiment of the present invention.

FIG. 7 is a cross sectional view schematically showing the construction of an active energy irradiating apparatus according to a second embodiment of the present invention. As shown in the drawing, the active energy irradiating apparatus comprises an irradiating chamber 21 for irradiating a specified portion with an active energy beam, an irradiating unit (irradiating apparatus) 22 for irradiating the target object 10 with the active energy beam within the irradiating chamber 21, an inert gas supply mechanism 23 for supplying the inert gas into the irradiating chamber 21 through an inert gas supply pipe 24, and a fine differential pressure gage 25.

The irradiating chamber 21 is provided with a transport inlet 26 for continuously transporting the target object 10 into the irradiating chamber 21, and a transport outlet 27 for continuously transporting the target object 10 from within the irradiating chamber 21. The target object 10 is transported within the irradiating chamber 21 by a plurality of transport rolls 28.

A slit 29 is formed in the transport inlet 26. The slit 29 can be moved in a vertical direction by a lift mechanism 30 such as a cylinder, with the result that it is possible to adjust the distance, i.e., the opening, between the target object 10 and the slit 29. The slit 29 is arranged on the transport roll 28. The particular construction produces the merits that it is possible to prevent the target object 10 from being fluttered in the transport inlet 26, and that it is possible to adjust optionally the height of the slit 29 of the transport inlet 26.

A nip roll 31 is arranged on the side of the transport outlet. The nip roll 31 can also be moved in a vertical direction by a lift mechanism 32 such as a cylinder so as to adjust optionally the height of the nip roll 31. The nip roll 31 is arranged on the transport roll 28. It is possible for the nip roll 31 to nip completely the target object. However, the nip roll 31 is constructed to adjust the clearance between the nip roll 31 and the target object because there is the case where it is desirable for the target object to avoid the contact with the nip roll 31 depending on the kind of the target object to prevent a damage done to the surface of the target object. Also, the lift mechanism 32 for adjusting the height of the nip roll 31 performs the function of an adjusting mechanism for maintaining a desired concentration of the inert gas atmosphere within the irradiating chamber. Incidentally, the size of the opening can be adjusted by adjusting the clearance of the transport duct in the first embodiment described previously.

A flow rate adjusting mechanism 33 is mounted to an intermediate portion of each of the two inert gas supply pipes 24 extending from the inert gas supply mechanism 23. It is possible to adjust the supply amount of the inert gas into the irradiating chamber 21 by operating the flow rate adjusting mechanism 33.

The transport roll 28 on the side of the transport inlet in the drawing is a driving roll, which is driven by a driving mechanism 34. By the rotation of the transport roll 28 caused by the driving mechanism 34, the target object 10 is transported within the irradiating chamber 21 at a predetermined speed. A speed regulator 35 is connected to the driving mechanism 34 so as to make the transport speed of the target object variable.

The fine differential pressure gage 25 measures the differential pressure between the pressure within the irradiating chamber and the atmospheric pressure outside the irradiating chamber.

In this embodiment, the supply of the inert gas or the size of the opening of the transport inlet portion and/or the transport outlet portion is adjusted on the basis of the differential pressure thus measured. Alternatively, both the supply of the inert gas and the size of the opening noted above are adjusted on the basis of the differential pressure thus measured. As a result, the differential pressure is maintained at a desired value, preferably at a constant value.

The fine pressure differential gage 25 permits measuring a differential pressure. In addition, it is also possible to use two pressure gages arranged both inside and outside the irradiating chamber. In this case, the differential pressure is obtained by subtracting the lower pressure measured by one of these two pressure gages from the higher pressure measured by the other pressure gage.

A desired value of the differential pressure differs in general depending on the kind of the active energy beam irradiating apparatus, etc. However, in controlling the pressure to maintain the differential pressure at a constant value, the pressure should be controlled to permit the error range or the allowable range of the differential pressure to be not larger than 10 Pa, preferably not larger than 5 Pa, and more preferably not larger than 2 Pa.

For controlling the supply of the inert gas, the supply amount is controlled in general. For example, the supply amount is controlled by measuring the inert gas pressure or the flow rate. In the apparatus shown in FIG. 7, the supply amount of the inert gas can be controlled by the flow rate adjusting mechanism 33.

The size of the opening can be controlled by vertically moving the slit 29 on the side of the transport inlet 26 and/or the nip roll 31 on the side of the transport outlet 27.

An appropriate value of the differential pressure between the pressure within the irradiating chamber and the pressure outside the irradiating chamber differs depending on the transport speed of the target object 10. It follows that it is also possible to arrive at an appropriate value of the differential pressure by changing the transport speed of the target object 10 on the basis of the actual differential pressure. For example, it is possible to provide a sufficient inert gas atmosphere by decreasing the transport speed of the target object 10 in the case where, for example, the differential pressure is lowered. In this case, the speed regulator 35 is controlled on the basis of the differential pressure measured by the fine differential pressure gage 25.

As described above, it is possible to obtain an appropriate differential pressure by controlling at least one of (a) the supply of the inert gas, (b) the size of the opening of the transport inlet and/or the transport outlet, and (c) the transport speed of the target object so as to stably maintain the atmosphere within the irradiating chamber 21.

Figure 8:
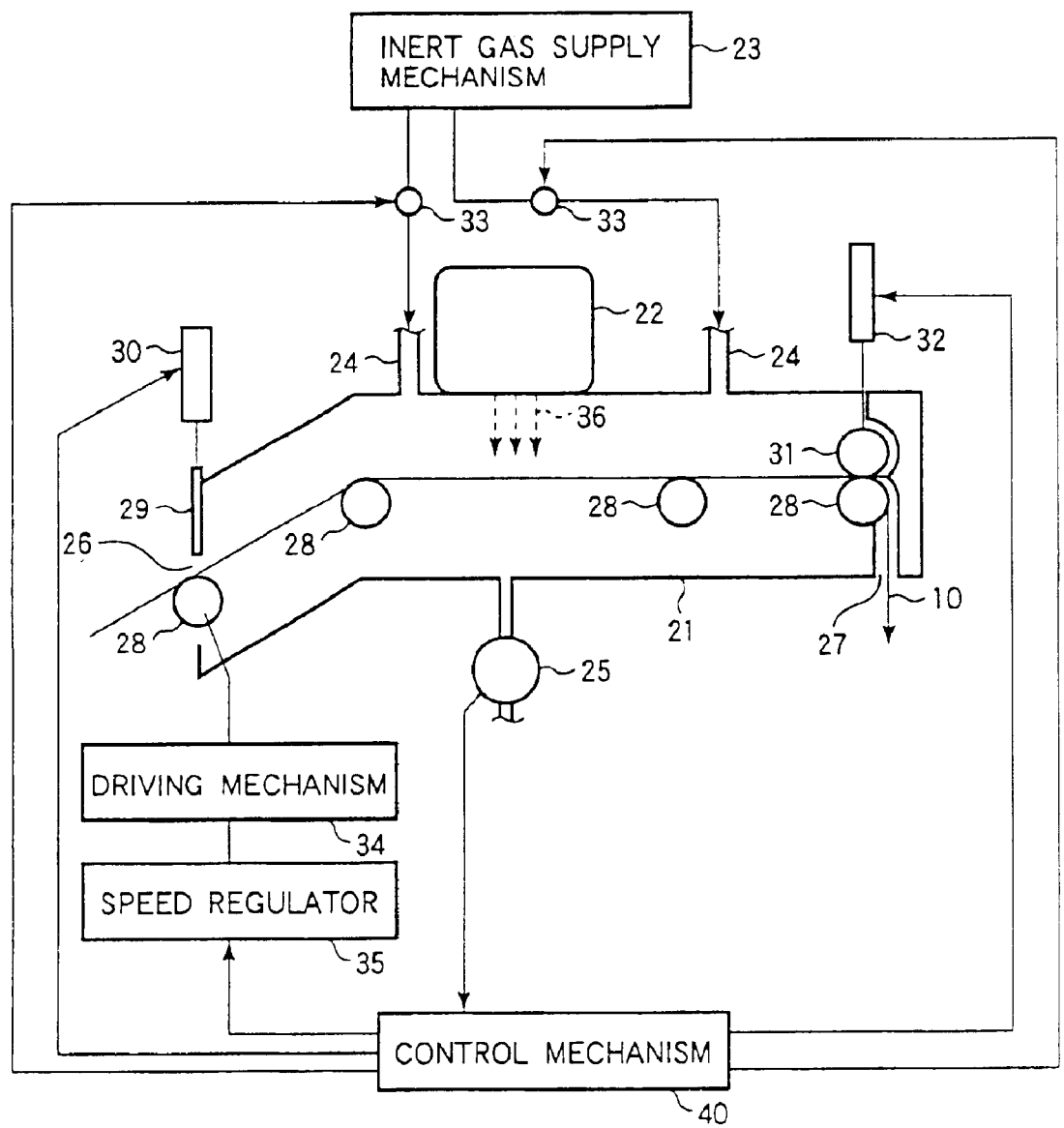
FIG. 8 is a cross sectional view schematically showing as another example the construction of an active energy beam irradiating apparatus according to the second embodiment of the present invention.

It is also possible to arrange a control mechanism 40 as shown in FIG. 8. In this case, at least one of the flow rate adjusting mechanism 33, the lift mechanisms 30, 32 and the speed regulator 35 is controlled by the control mechanism 40 on the basis of the differential pressure measured by the fine differential pressure gage 25 so as to control at least one of the supply amount of the inert gas, the size of the transport inlet, the size of the transport outlet, and the transport speed of the target object. By this control, it is possible to stabilize the atmosphere within the irradiating chamber 21 more efficiently.

The active energy beam 36 emitted from the irradiating unit 22 includes, for example, an electron beam, an ultraviolet light, a γ-ray, an X-ray and a neutron ray. It is desirable for the active energy beam 36 to be an electron beam requiring an inert gas in many cases. Also, where the target object is intended to be cured, crosslinked or modified upon irradiation with the active energy beam, i.e., where the target object consists of a paper sheet, a metal sheet or a plastic film or sheet coated with, for example, a printing ink, a paint or an adhesive, it is practical for the target object to be irradiated with an electron beam and/or an ultraviolet light in terms of the output and the operability. It is desirable to use an electron beam irradiating apparatus having a low accelerating voltage, e.g., 100 kV or less, or an irradiating apparatus having a vacuum tube type electron beam irradiating section.

The inert gas used in this embodiment represents a gas that does not perform easily a chemical reaction such as a nitrogen gas, a carbon dioxide gas, a helium gas or an argon gas. In practice, a nitrogen gas or a carbon dioxide gas is used in the present invention as the inert gas. It is also possible to use as the inert gas a mixed gas of oxygen and an inert gas having an oxygen concentration lower than that of the air.

In this embodiment, the differential pressure between the pressure within the irradiating chamber 21 and the atmospheric pressure can be increased by decreasing the height of the opening of the slit 29 on the side of the transport inlet and by nipping with the nip roll 31 on the side of the transport outlet. Therefore, it is unnecessary to arrange a partition chamber or the like in the front portion of the irradiating chamber, making it possible to miniaturize the apparatus. As a result, it is possible to decrease the amount of the inert gas used.

It should also be noted that the required differential pressure between the pressure inside the irradiating chamber and the pressure outside the irradiating chamber, which is generally the atmospheric pressure though the pressure outside the irradiating chamber need not be the atmospheric pressure, is a positive pressure and is constant. Therefore, the inert gas atmosphere can be controlled based on the detected value of the cheap and convenient fine differential pressure gage 25.

In this embodiment, the differential pressure between the pressure inside the irradiating chamber 21 and the pressure outside the irradiating chamber can be maintained constant. It follows that it is possible to carry out the active energy beam irradiation under a desired inert gas atmosphere so as to cure, crosslink or modify the target object 10.

An X-ray is emitted in some cases from the active energy beam irradiating apparatus in the second embodiment, too, making it desirable employ an X-ray shielding structure.

Each of the two embodiments described above is directed to an active energy beam irradiation under an inert gas atmosphere. However, the active energy beam irradiation can also be performed under a reactive gas atmosphere by using a reactive gas such as an oxygen gas, a hydrogen gas, a hydrocarbon gas, a fluorine gas or a chlorine gas, in place of the inert gas atmosphere, so as to carry out the reaction or the modification, thereby utilizing efficiently the reactive gas for the reaction or modification of the target object. It is also possible to use as the reactive gas a mixed gas consisting of an oxygen gas and a nitrogen gas, said mixed gas having an oxygen concentration higher than that of the air.

The method and apparatus of the present invention can be applied to a target object that is to be cured, crosslinked or modified by the active energy beam irradiation. For example, the present invention can be applied to a substrate such as a paper sheet, a metal sheet and a plastic film or sheet, said substrate being coated with, for example, a printing ink, a paint or an adhesive.

The target object used in the present invention is not limited to continuous sheet-like material (web). It is possible to transport a plurality of sheets used as the target object one by one continuously or intermittently.

EXAMPLES

Some Examples of the present invention will now be described. Examples 1 to 5 and Comparative Examples 1 and 2 correspond to the first embodiment described previously, and Examples 6 and 7 correspond to the second embodiment of the present invention.

Example 1

In order to look into the relationship between the inert gas distributing ratio C (C=X/Y) caused by the gas flow resistance of the individual transport ducts in the transport inlet and the transport outlet and the purity of the inert gas atmosphere within the irradiating chamber, the oxygen gas concentration in the irradiating chamber relative to the transport speed of the target object was measured in the case where a nitrogen gas was supplied through the inert gas supply pipe at a flow rate of 200 L/min into an active energy beam irradiation apparatus as shown in FIG. 1, which was constructed such that a transport duct having the gas flow resistor 11 having the cover structure 11a shown in FIG. 2 applied thereto was mounted to the transport inlet. A Min-EB apparatus (vacuum vessel type electron beam irradiating apparatus) manufactured by American International Technologies Inc. (USA) was used as the active energy beam source. The acceleration voltage was set at 60 kV.

In this experiment, the clearance b shown in FIG. 1 was set at 1 mm, the distance L was set at 60 mm, and the angle θ was set at 45°. Also, the width of the opening was set at 340 mm in each of the inlet port and the outlet port.

An oxygen densitometer (Zirconia type oxygen densitometer LC-750H/PC-111 manufactured by Toray Engineering Inc.) was mounted to the center of the irradiating chamber. A PET (polyethylene terephthalate) film having a width of 250 mm and a thickness of 50 μm, which was used as a target object, was transported at a transport speed of 0, 50, 100, 150, 200 and 250 m/min.

For calculating the inert gas distributing ratio C (=X/Y), the gas flow resistance was adjusted by changing the clearance "a" between the transport roll and the gas flow resistor within the transport duct mounted in each of the transport inlet and the transport outlet, and inert gas distributing ratio was calculated from the flow rate of the nitrogen gas discharged from the duct. The clearance "a" of the transport duct arranged in each of the transport inlet and the transport outlet was set as follows:

| Experiment No. | Clearance at transport inlet | Clearance at transport outlet |
| --- | --- | --- |
| 1 | 1.0 mm | 0.5 mm |
| 2 | 1.5 mm | 1.0 mm |
| 3 | 2.0 mm | 1.5 mm |

In each of Experiments 1 to 3, the clearance "a" on the outlet side is set smaller than the clearance "a" on the inlet side, with the result that the gas flow resistance in the transport duct on the outlet side was higher than that on the inlet side. In other words, the inert gas distributing ratio C was set at: C=X/Y>1. The test results are shown in Table 1.

As apparent from Table 1, it was possible to maintain the oxygen concentration at a level not higher than 200 ppm over the entire region of the transport speed of the target object ranging between 0 and 250 m/min. Further, where the apparatus was operated with the active energy beam source set at 1,000 W, the leakage of the active energy beam was lower than the measurable limit.

Example 2

Experiments were performed under the conditions equal to those for Example 1, except that the clearance "a" of the transport duct arranged in each of the transport inlet and the transport outlet was set as shown below:

| Experiment No. | Clearance at transport inlet | Clearance at transport outlet |
| --- | --- | --- |
| 4 | 0.5 mm | 0.5 mm |
| 5 | 1.0 mm | 1.0 mm |
| 6 | 1.5 mm | 1.5 mm |
| 7 | 2.0 mm | 2.0 mm |

In each of Experiments 4 to 7, the clearance "a" on the inlet side was set equal to that on the outlet side and, thus, the transport duct on the inlet side was equal to the transport duct on the outlet side in the gas flow resistance. In other words, the inert gas distributing ratio C was: C=X/Y=1. The experimental data are also shown in Table 1.

Example 3

Transport ducts each equipped with the gas flow resistor 11 consisting of the partition walls 11b shown in FIG. 3 were arranged both forward of and rearward of the irradiating chamber. The gas flow resistor 11 was formed of five partition walls 11b. The clearance "a" between the transport roll and the gas flow resistor within the transport duct arranged in each of the transport inlet and the transport outlet was set as follows:

| Experiment No. | Clearance at transport inlet | Clearance at transport outlet |
| --- | --- | --- |
| 8 | 1.0 mm | 0.5 mm |
| 9 | 1.5 mm | 1.0 mm |
| 10 | 2.0 mm | 1.5 mm |

The other conditions were set equal to those for Example 1.

In each of Experiments 8 to 10, the clearance "a" on the outlet side is set smaller than the clearance "a" on the inlet side, with the result that the gas flow resistance in the transport duct on the outlet side was higher than that on the inlet side. In other words, the inert gas distributing ratio C was set at: C=X/Y>1. The test results are also shown in Table 1.

As apparent from Table 1, it was possible to maintain the oxygen concentration at a level not higher than 100 ppm over the entire region of the transport speed of the target object ranging between 0 and 250 m/min. Further, where the apparatus was operated with the active energy beam source set at 1,000 W, the leakage of the active energy beam was lower than the measurable limit.

Example 4

Experiments 11 to 13 were performed under the conditions equal to those for Example 1, except that the doctor shown in FIG. 6 was added to each of the transport ducts used in Example 1 in the transport inlet and the transport outlet. It has been found possible to maintain the oxygen concentration at a level not higher than 100 ppm over the entire region of the transport speed of the target object ranging between 0 and 250 m/min. Further, where the apparatus was operated with the active energy beam source set at 1,000 W, the leakage of the active energy beam was lower than the measurable limit.

Example 5

The transport duct as shown in FIG. 2 was mounted on the side of the transport inlet and the nip roll type transport duct as shown in FIG. 4 was mounted on the side of the transport outlet, as shown in FIG. 5. The clearance between the transport roll and the gas flow resistor within the transport duct mounted on the transport inlet was set as follows:

| Experiment No. | Clearance at transport inlet |
|---|---|
| 14 | 1.0 mm |
| 15 | 1.5 mm |
| 16 | 3.0 mm |
| 17 | 5.0 mm |

The oxygen concentration and the leaking X-ray amounts were measured with the other conditions set equal to those for Example 1. It has been found that, for Experiments 14, 15 and 16, it is possible to maintain the oxygen concentration at 200 ppm or less over the entire region of the transport speed of the target object ranging between 0 and 250 m/min, and that, for Experiment 17, it is possible to maintain the oxygen concentration at 500 ppm or less over the entire region of the transport speed of the target object ranging between 0 and 250 m/min. Further, where the apparatus was operated with the active energy beam source set at 1,000 W, the leakage of the active energy beam was lower than the measurable limit.

Comparative Example 1

Used were the active energy beam irradiating apparatus and the transport duct for Example 1, and the clearance between the transport roll and the gas flow resistor within the transport duct mounted to each of the transport inlet and the transport outlet was set as follows:

| Experiment No. | Clearance at transport inlet | Clearance at transport outlet |
|---|---|---|
| 18 | 0.5 mm | 1.0 mm |
| 19 | 1.0 mm | 1.5 mm |
| 20 | 1.5 mm | 2.0 mm |

The other conditions were set equal to those for Example 1.

In each of Experiments 18 to 20, the clearance on the outlet side was set larger than that on the inlet side so as to allow the transport duct on the inlet side to have a gas flow resistance higher than that on the outlet side. In other words, the inert gas distributing ratio C was set at: C=X/Y<1.

It has been found that the oxygen concentration was not higher than 100 ppm when the transport of the target object was stopped. However, when the transport speed of the target object was increased to 100 m/min or more, the oxygen concentration was increased to reach a level not lower than 1,000 ppm.

Comparative Example 2

Used were the active energy beam irradiating apparatus and the transport duct for Example 3, and the clearance between the transport roll and the gas flow resistor within the transport duct mounted to each of the transport inlet and the transport outlet was set as follows:

| Experiment No. | Clearance at transport inlet | Clearance at transport outlet |
|---|---|---|
| 21 | 0.5 mm | 1.0 mm |
| 22 | 1.0 mm | 1.5 mm |
| 23 | 1.5 mm | 2.0 mm |

The other conditions were set equal to those for Example 3.

In each of Experiments 21 to 23, the clearance on the outlet side was set larger than that on the inlet side so as to allow the transport duct on the inlet side to have a gas flow resistance higher than that on the outlet side. In other words, the inert gas distributing ratio C was set at: C=X/Y<1.

It has been found that the oxygen concentration was not higher than 100 ppm when the transport of the target object was stopped. However, when the transport speed of the target object was increased to 100 m/min or more, the oxygen concentration was increased to reach a level not lower than 1,000 ppm.

As apparent from the comparison between Examples 1 to 5 and Comparative Examples 1 and 2, in order to maintain a low oxygen concentration with a high stability within the irradiating chamber by using a small amount of the inert gas in a system in which the target object is transported into the irradiating chamber at a predetermined transport speed, it is important to design the transport ducts forming the transport inlet and the transport outlet such that the gas flow resistance in the transport outlet is rendered higher than that in the transport inlet. To be more specific, it is important to design the transport ducts so as to allow the inert gas distributing ratio C to be 1 or more, preferably not smaller than 1, more preferably not smaller than 1.5. In this case, the inert gas can be effectively utilized for the substitution in the irradiating chamber.

TABLE 1

| Examples | Experiment No. | Clearance of transport duct arranged in transport inlet [mm] | Clearance of transport duct arranged in transport outlet [mm] | X/Y | Difference between pressure inside irradiating chamber and atmospheric pressure [Pa] | Oxygen concentration [ppm] |
|---|---|---|---|---|---|---|
| Example 1 | 1 | 1 | 0.5 | 3.3 | 150 | ⊙ |
| | 2 | 1.5 | 1 | 1.8 | 50 | ⊙ |
| | 3 | 2 | 1.5 | 1.6 | 20 | ⊙ |
| Example 2 | 4 | 0.5 | 0.5 | 1.0 | 730 | ⊙ |
| | 5 | 1 | 1 | 1.0 | 100 | ⊙ |
| | 6 | 1.5 | 1.5 | 1.0 | 50 | ○ |
| | 7 | 2 | 2 | 1.0 | 2 | Δ |

TABLE 1-continued

| Examples | Experiment No. | Clearance of transport duct arranged in transport inlet [mm] | Clearance of transport duct arranged in transport outlet [mm] | X/Y | Difference between pressure inside irradiating chamber and atmospheric pressure [Pa] | Oxygen concentration [ppm] |
|---|---|---|---|---|---|---|
| Example 3 | 8 | 1 | 0.5 | 3.5 | 60 | ◎ |
| | 9 | 1.5 | 1 | 2.0 | 20 | ◎ |
| | 10 | 2 | 1.5 | 1.8 | 10 | ◎ |
| Example 4 | 11 | 1 | 0.5 | 3.3 | 150 | ◎ |
| | 12 | 1.5 | 1 | 1.8 | 50 | ◎ |
| | 13 | 2 | 1.5 | 1.6 | 20 | ◎ |
| Example 5 | 14 | 1 | Nip roll | 7.0 | 200 | ◎ |
| | 15 | 1.5 | Nip roll | 9.0 | 80 | ◎ |
| | 16 | 3 | Nip roll | 12.3 | 15 | ◎ |
| | 17 | 5 | Nip roll | 19.0 | 5 | ◎ |
| Comparative Example 1 | 18 | 0.5 | 1 | 0.3 | 60 | X |
| | 19 | 1 | 1.5 | 0.6 | 20 | X |
| | 20 | 1.5 | 2 | 0.6 | 10 | X |
| Comparative Example 2 | 21 | 0.5 | 1 | 0.3 | 150 | X |
| | 22 | 1 | 1.5 | 0.6 | 50 | X |
| | 23 | 1.5 | 2 | 0.6 | 20 | X |

In the column of the oxygen concentration in Table 1, the mark ◎ denotes that the oxygen concentration was stably maintained at a level not higher than 200 ppm regardless of the transport speed of the target object, the mark ○ denotes that the oxygen concentration was not higher than 200 ppm when the transport speed of the target object was low and tended to approach 500 ppm if the transport speed was increased, the mark Δ denotes that the oxygen concentration exceeded 500 ppm so as to approach 1,000 ppm if the transport speed of the target object was increased, and the mark x denotes that the oxygen concentration exceeded 1,000 ppm if the transport speed of the target object was increased. It should be noted that the value in the column of the differential pressure in Table 1 covers the case where the transport of the target object was stopped.

Example 6

In order to look into the influence give by the height of the opening of the transport inlet and the transport outlet, the oxygen concentration within the irradiating chamber relative to the inert gas flow rate and the differential pressure between the pressure within the irradiating chamber and the atmospheric pressure were measured by using the active energy beam irradiating apparatus (Min-EB apparatus) shown FIG. 7. The oxygen densitometer and the fine differential pressure gage for measuring the differential pressure were mounted in the central portion of the irradiating chamber. A nitrogen gas was used as the inert gas, and a PET (polyethylene terephthalate) film having a width of 250 mm and a thickness of 50 μm, which was used as the target object, was transported at a transport speed of 200 m/min. The heights of the transport inlet and the transport outlet were measured under the conditions given in Table 2. Also, the width of the opening in each of the inlet port and the outlet port was 340 mm.

TABLE 2

Figure 9:
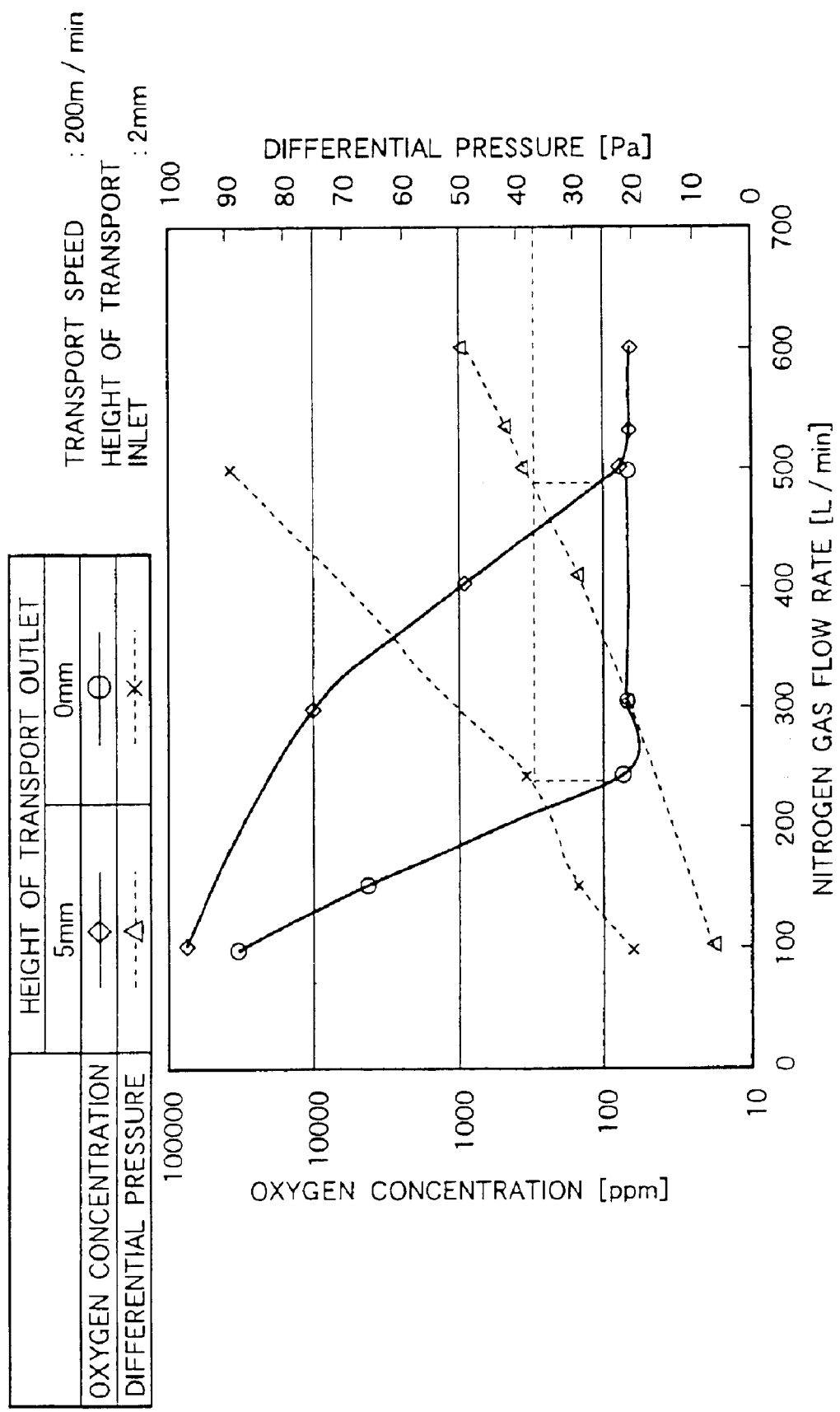
FIG. 9 is a graph showing the relationship between the nitrogen gas flow rate and the oxygen concentration, and the relationship between the nitrogen gas flow rate and the differential pressure, covering the case where the transport speed is set at 200 m/min, the height of the transport inlet is set at 2 mm, and the height of the transport outlet is changed within a range of between 5 mm and 0 mm.

| Experiment No. | Height of transport inlet | Height of transport outlet | Reference drawing |
|---|---|---|---|
| 24 | 2 mm | 5 mm | FIG. 9 |
| 25 | 2 mm | 0 mm | FIG. 9 |

TABLE 2-continued

Figure 10:
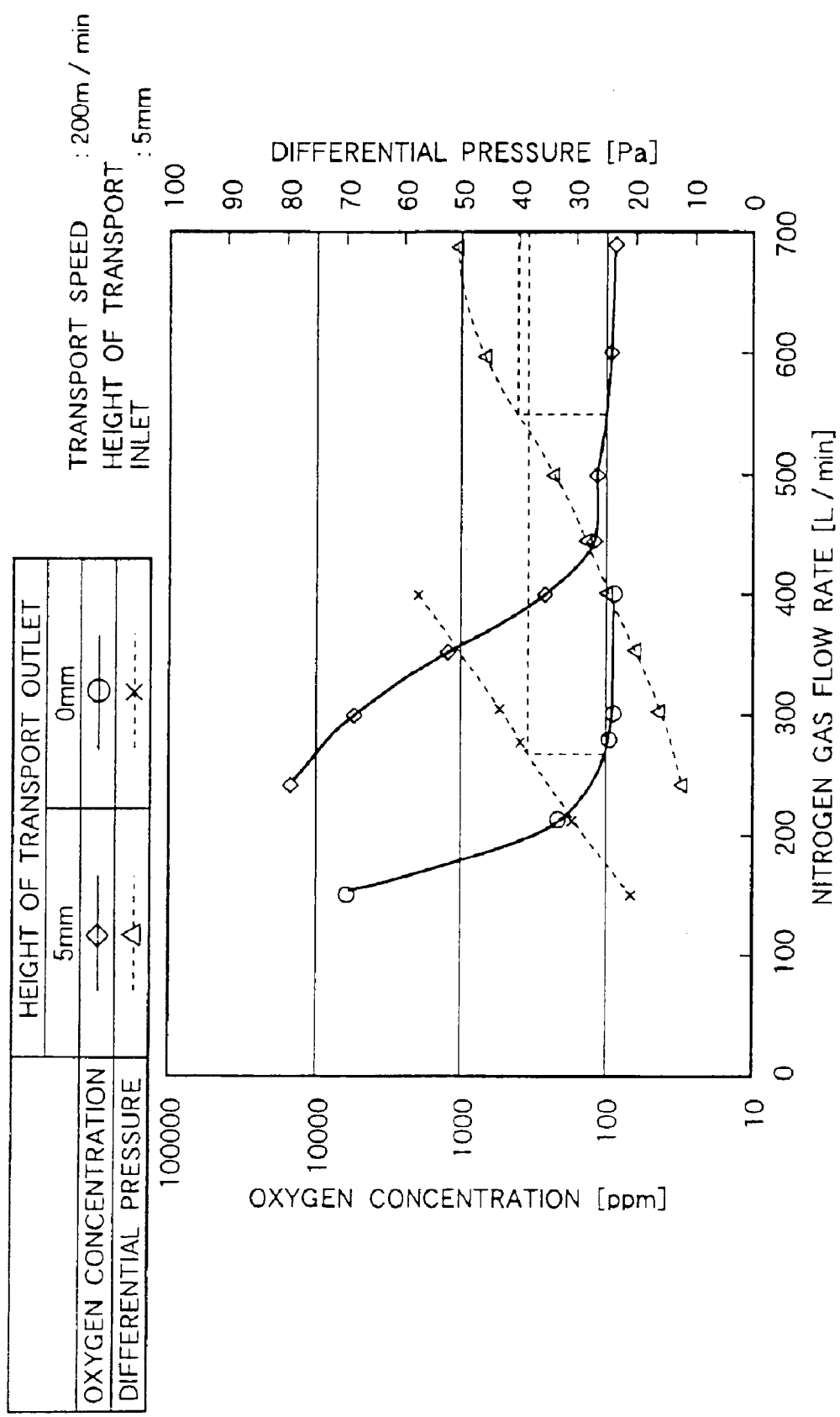
FIG. 10 is a graph showing the relationship between the nitrogen gas flow rate and the oxygen concentration, and the relationship between the nitrogen gas flow rate and the differential pressure, covering the case where the transport speed is set at 200 m/min, the height of the transport inlet is set at 5 mm, and the height of the transport outlet is changed within a range of between 5 mm and 0 mm.

| Experiment No. | Height of transport inlet | Height of transport outlet | Reference drawing |
|---|---|---|---|
| 26 | 5 mm | 5 mm | FIG. 10 |
| 27 | 5 mm | 0 mm | FIG. 10 |

FIG. 9 is a graph showing the relationship between the nitrogen gas flow rate and the oxygen concentration and the relationship between the nitrogen gas flow rate and the differential pressure, covering the case where the height of the transport inlet was fixed at 2 mm, and the height of the transport outlet was set at 5 mm or 0 mm (nip state).

As apparent from the graph of FIG. 9, the oxygen concentration is rendered 100 ppm or less under 5 mm of the height of the transport outlet when the nitrogen gas flow rate is set at 490 L/min, and the differential pressure in this case is 38 Pa.

Also, the oxygen concentration is rendered 100 ppm or less under 0 mm of the height of the transport outlet when the nitrogen gas flow rate is set at 230 L/min, and the differential pressure in this case is 38 Pa.

FIG. 10 is a graph showing the relationship between the nitrogen gas flow rate and the oxygen concentration and the relationship between the nitrogen gas flow rate and the differential pressure, covering the case where the height of the transport inlet was fixed at 5 mm, and the height of the transport outlet was set at 5 mm or 0 mm (nip state).

As apparent from the graph of FIG. 10, the oxygen concentration is rendered 100 ppm or less under 5 mm of the height of the transport outlet when the nitrogen gas flow rate is set at 560 L/min, and the differential pressure in this case is 40 Pa. Also, the oxygen concentration is rendered 100 ppm of less under 0 mm of the height of the transport outlet when the nitrogen gas flow rate is set at 270 L/min, and the differential pressure in this case is 39 Pa.

The experimental data support that the differential pressure between the pressure inside the irradiating chamber and the atmospheric pressure should be about 39 Pa in order to allow the oxygen concentration inside the irradiating chamber to be not higher than 100 ppm with a high stability under the condition that the target object is transported at a transport speed of 200 m/min.

In this Example, an electron beam curing type printing ink prepared by dispersing by a three-roll mill 60 parts by weight of a varnish having trimethylolpropane acrylate, diallyl phthalate resin, and hydroquinone dissolved therein, 20 parts by weight of a pigment, and 20 parts by weight of pentaerythritol tetraacrylate was printed on a PET film. The PET film was irradiated with an active energy beam under an accelerating voltage of 50 kV by using a vacuum tube type electron beam irradiating apparatus.

In any of the Experiments, the printing ink was cured. Even where the height of the transport outlet was set at 0 mm (nip state), the ink was not attached to the nip roll.

Example 7

The influence produced by the height of the opening in each of the transport inlet and the transport outlet was examined as in Example 6. The height in each of the transport inlet and the transport outlet was set as shown in Table 3. The transport speed of the target object was set at 150 m/min.

TABLE 3

Figure 11:
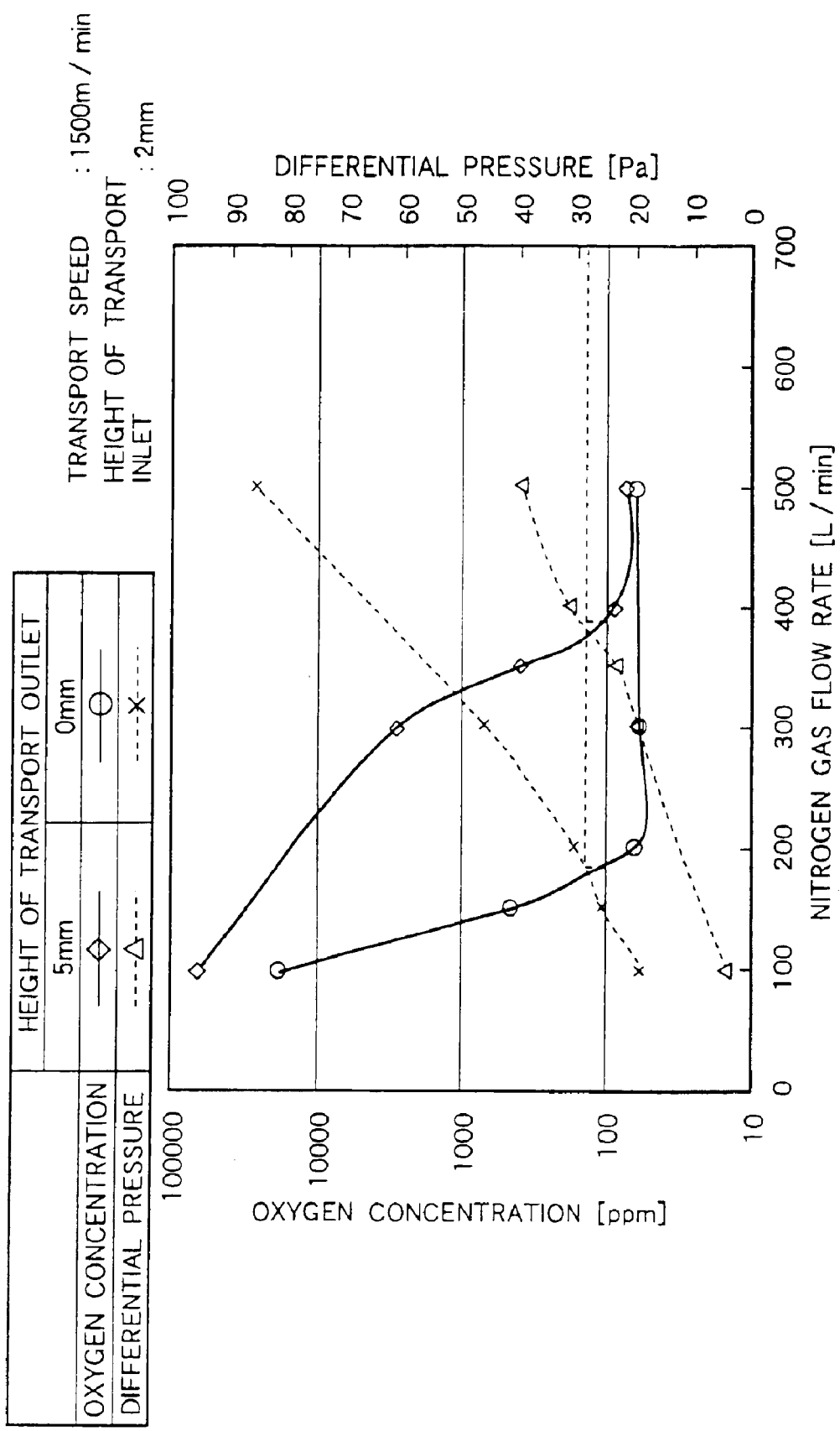
FIG. 11 is a graph showing the relationship between the nitrogen gas flow rate and the oxygen concentration, and the relationship between the nitrogen gas flow rate and the differential pressure, covering the case where the transport speed is set at 150 m/min, the height of the transport inlet is set at 2 mm, and the height of the transport outlet is changed within a range of between 5 mm and 0 mm.
Figure 12:
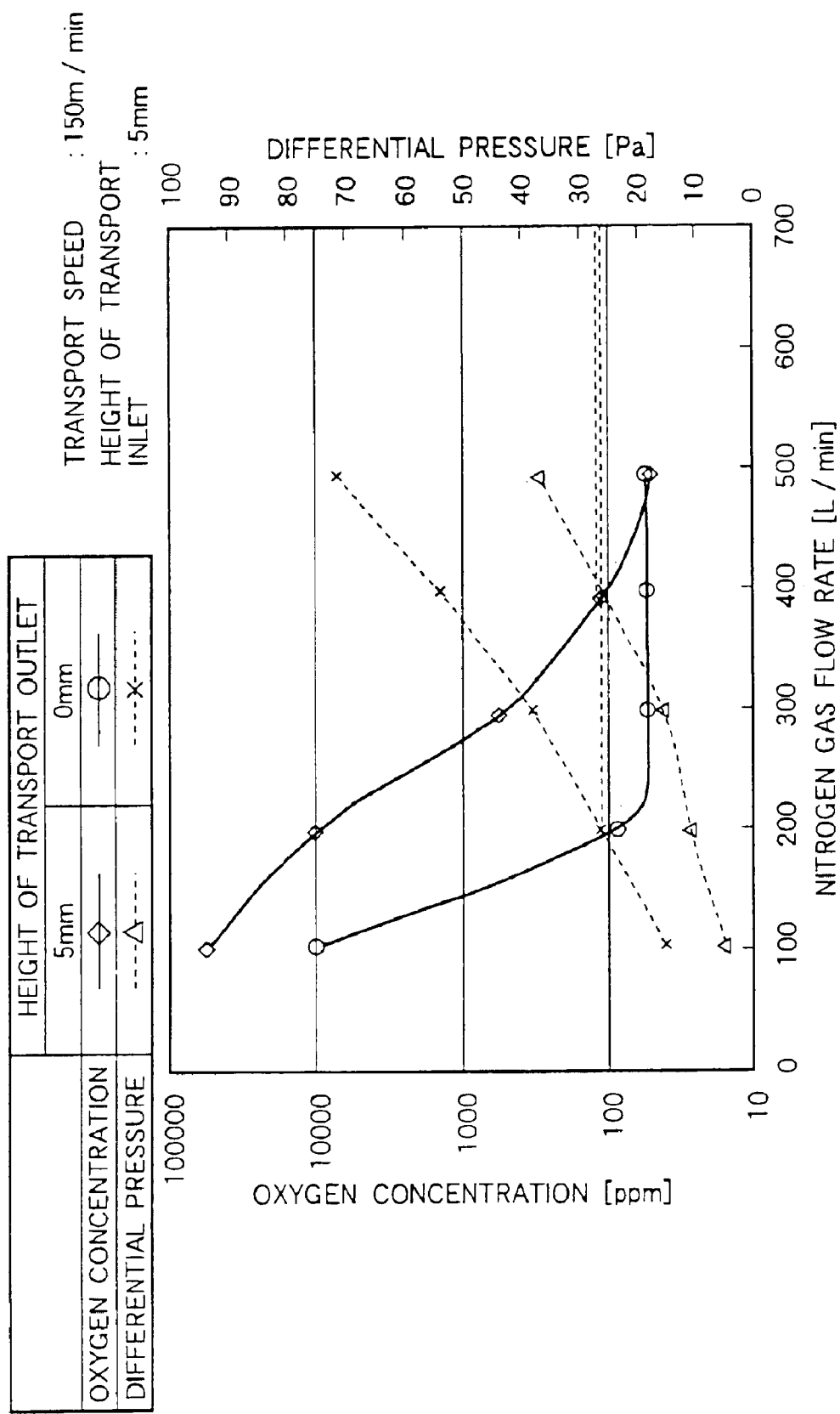
FIG. 12 is a graph showing the relationship between the nitrogen gas flow rate and the oxygen concentration, and the relationship between the nitrogen gas flow rate and the differential pressure, covering the case where the transport speed is set at 150 m/min, the height of the transport inlet is set at 5 mm, and the height of the transport outlet is changed within a range of between 5 mm and 0 mm.

| Experiment No. | Height of transport inlet | Height of transport outlet | Reference drawing |
|---|---|---|---|
| 28 | 2 mm | 5 mm | FIG. 11 |
| 29 | 2 mm | 0 mm | FIG. 11 |
| 30 | 5 mm | 5 mm | FIG. 12 |
| 31 | 5 mm | 0 mm | FIG. 12 |

FIG. 11 is a graph showing the relationship between the nitrogen gas flow rate and the oxygen concentration and the relationship between the nitrogen gas flow rate and the differential pressure, covering the case where the height in the transport inlet was fixed to 2 mm, and the height in the transport outlet was set at 5 mm or 0 mm (nip state).

As apparent from the graph of FIG. 11, the oxygen concentration is rendered 100 ppm or less under 5 mm of the height of the transport outlet when the nitrogen gas flow rate is set at 390 L/min, and the differential pressure in this case is 29 Pa. Also, the oxygen concentration is rendered 100 ppm or less under 0 mm of the height of the transport outlet when the nitrogen gas flow rate is set at 180 L/min, and the differential pressure in this case is also 29 Pa.

FIG. 12 is a graph showing the relationship between the nitrogen gas flow rate and the oxygen concentration, and the relationship between the nitrogen gas flow rate and the differential pressure, covering the case where the height in the transport inlet was fixed to 5 mm, and the height in the transport outlet was set at 5 mm or 0 mm (nip state).

As apparent from the graph of FIG. 12, the oxygen concentration is rendered 100 ppm or less under 5 mm of the height of the transport outlet when the nitrogen gas flow rate is set at 400 L/min, and the differential pressure in this case is 28 Pa. Also, the oxygen concentration is rendered 100 ppm or less under 0 mm of the height of the transport outlet when the nitrogen gas flow rate is set at 200 L/min, and the differential pressure in this case is 27 Pa.

The experimental data support that the differential pressure between the pressure inside the irradiating chamber and the atmospheric pressure should be about 28 Pa in order to allow the oxygen concentration inside the irradiating chamber to be not higher than 100 ppm with a high stability under the condition that the target object is transported at a transport speed of 150 m/min.

In the experiments in Example 7, the printing ink was found to have been cured as in Example 6.

Table 4 shows the results of Examples 6 and 7 in respect of the conditions under which the oxygen concentration within the irradiating chamber is rendered 100 ppm or less.

TABLE 4

| Experiment No. | Transport speed (m/min) | Height of transport inlet (mm) | Height of transport outlet (mm) | Differential pressure (Pa) | Amount of nitrogen gas used (L/min) |
|---|---|---|---|---|---|
| 24 | 200 | 2 | 5 | 38 | 490 |
| 25 | 200 | 2 | 0 | 38 | 230 |
| 26 | 200 | 5 | 5 | 40 | 560 |
| 27 | 200 | 5 | 0 | 39 | 270 |
| 28 | 150 | 2 | 5 | 29 | 390 |
| 29 | 150 | 2 | 0 | 29 | 180 |
| 30 | 150 | 5 | 5 | 28 | 400 |
| 31 | 150 | 5 | 0 | 27 | 200 |

Table 4 shows that, if the transport speed of the target object is set constant, the differential pressure is constant in any of the experiments in examples 6 and 7 under the condition that the oxygen concentration within the irradiating chamber is stabilized at a level not higher than 100 ppm. It follows that it is important to carry out the active energy beam irradiation under the nitrogen gas flow rate and the height in each of the transport inlet and the transport outlet, which are combined to permit the differential pressure to be constant. In other words, what is important in transporting the target object at a certain transport speed is to control the pressure inside the irradiating chamber so as to set up the required differential pressure. It follows that, if the apparatus is constructed such that the differential pressure is increased even if the nitrogen gas flow rate is low, it is possible to lower the nitrogen gas flow rate so as to save the running cost.

The structure that permits a high differential pressure between the pressure inside the irradiating chamber and the atmospheric pressure is the structure utilizing a nip roll in the transport outlet and the structure in which the height of the transport inlet is made as small as possible. When it comes to such a structure, it is basically unnecessary to arrange a partition chamber in the front portion of the irradiating chamber so as to make it possible to miniaturize the conventional apparatus. It should also be noted that, since it is possible to control the irradiating atmosphere by using a cheap fine differential pressure gage without using a costly oxygen densitometer as used in the past, it is also possible to reduce the cost of the apparatus.

What is claimed is:

1. An apparatus used for active energy beam irradiation, comprising:

an irradiating chamber for irradiating a target object with an active energy beam, the irradiating chamber including a transport inlet for transporting the target object into the irradiating chamber and a transport outlet for transporting the target object out of the irradiating chamber;

an irradiating apparatus for irradiating the target object with the active energy beam within the irradiating chamber; and a gas supply mechanism for supplying one of an inert gas and a reactive gas into the irradiating chamber to thereby set up one of an inert gas atmosphere and a reactive gas atmosphere within the irradiating chamber, wherein the irradiating chamber includes an irradiating section for irradiating the target object with the active energy beam emitted from the irradiating apparatus, and a transport duct having a gas flow resistor to set up a condition of X/Y≧1, where X represents a gas amount passing through the transport inlet and Y represents a gas amount passing through the transport outlet, wherein the transport duct includes a transport roll and a roll cover at least partially covering the transport roll, both arranged on a first side of one of a front surface and a back surface of the target object passing through the transport duct, and wherein the gas flow resistor is arranged on a second side, wherein the gas flow resistor comprises one of: at least one partition wall, a cover arranged to conform with the shape of the transport roll and covering the target object and the transport roll, and a nip roll and a roll cover covering the nip roll.

2. The active energy beam irradiating apparatus according to claim 1, further comprising a doctor blade to shield gas entry, arranged between the transport roll and the roll cover or between the nip roll and the roll cover covering the nip roll.

3. An apparatus used for active energy beam irradiation of a target object, comprising:
an irradiating chamber including a transport inlet for transporting the target object into the irradiating chamber and a transport outlet for transporting the target object out of the irradiating chamber;
an irradiating apparatus for irradiating the target object with an active energy beam within the irradiating chamber; and
a gas supply mechanism for supplying one of an inert gas and a reactive gas into the irradiating chamber to thereby set up one of an inert gas atmosphere and a reactive gas atmosphere within the irradiating chamber,
wherein the irradiating chamber includes:
an irradiating section for irradiating the target object with the active energy beam emitted from the irradiating apparatus;
a first transport duct arranged on the side of the transport inlet; and
a second transport duct arranged on the side of the transport outlet,
wherein a gas flow resistance of the second transport duct is equal to or higher than a gas flow resistance of the first transport duct;
wherein at least one of the first transport duct and the second transport duct includes a transport roll and a roll cover at least partially covering the transport roll, both arranged on a first side of one of a front surface and a back surface of the target object passing through the transport ducts, and a gas flow resistor arranged on a second side, and
wherein the gas flow resistor comprises one of: at least one partition wall, a cover arranged to conform with the shape of the transport roll and covering the target object and the transport roll, and a nip roll and a roll cover covering the nip roll.

4. The active energy beam irradiating apparatus according to claim 3, further comprising a doctor blade to shield gas entry, arranged between the transport roll and the roll cover or between the nip roll and the roll cover covering the nip roll.

5. An apparatus used for active energy beam irradiation of a target object, comprising:
an irradiating chamber including a transport inlet for transporting the target object into the irradiating chamber and a transport outlet for transporting the target object out of the irradiating chamber;
an irradiating apparatus for irradiating the target object with an active energy beam within the irradiating chamber; and
a gas supply mechanism for supplying one of an inert gas and a reactive gas into the irradiating chamber to thereby set up one of an inert gas atmosphere and a reactive gas atmosphere within the irradiating chamber,
wherein the irradiating chamber includes:
an irradiating section for irradiating the target object with the active energy beam emitted from the irradiating apparatus;
a first transport duct arranged on the side of the transport inlet; and
a second transport duct arranged on the side of the transport outlet,
wherein a gas flow resistance of the second transport duct is equal to or higher than a gas flow resistance of the first transport duct,
wherein at least one of the first transport duct and the second transport duct includes a transport roll and a roll cover at least partially covering the transport roll, both arranged on a first side of one of a front surface and a back surface of the target object passing through the transport ducts, and a gas flow resistor arranged on a second side, and
wherein the first transport duct differs in structure from the second transport duct.

6. The active energy beam irradiating apparatus according to claim 5, wherein
the first transport duct comprises one of: at least one partition wall, a cover arranged to conform with the shape of the transport roll and covering the target object and the transport roll, and a nip roll and a roll cover covering the nip roll, and
the second transport duct comprises one of: at least one partition wall, a cover arranged to conform with the shape of the transport roll and covering the target object and the transport roll, and a nip roll and a roll cover covering the nip roll, the first transport duct differing in structure from the second transport duct.

7. An apparatus used for active energy beam irradiation, comprising:
an irradiating chamber including a transport inlet for transporting a target object into the irradiating chamber and a transport outlet for transporting the target object out of the irradiating chamber;
an irradiating apparatus for irradiating the target object with an active energy beam within the irradiating chamber; and
a gas supply mechanism for supplying one of an inert gas and a reactive gas into the irradiating chamber thereby to set up one of an inert gas atmosphere and a reactive gas atmosphere within the irradiating chamber,
wherein the irradiating chamber includes:
an irradiating section for irradiating the target object with the active energy beam emitted from the irradiating apparatus
a transport duct arranged on the side of the transport inlet; and
a transport duct arranged on the side of the transport outlet,
wherein the transport duct on the side of the transport inlet includes a transport roll and a roll cover at least partially covering the transport roll, both arranged on a first side of a front surface and a back surface of the target object passing through the transport duct, and includes a gas flow resistor which is arranged on a second side and which has one of at least one partition wall and a cover arranged to conform with the shape of the transport roll and constructed to cover the target object and the transport roll;

wherein the transport duct on the side of the transport outlet includes a transport roll and a roll cover at least partially covering the transport roll, both arranged on a first side of one of the front surface and the back surface of the target object passing through the transport duct, and includes a gas flow resistor arranged on a second side and having a nip roll and a nip roll cover covering the nip roll; and wherein a gas flow resistance of the transport duct on the side of the transport outlet is higher than a gas flow resistance of the transport duct on the side of the transport inlet.

8. A transport duct for an apparatus for an active energy beam irradiation, comprising:

a transport roll and a roll cover at least partially covering the transport roll, both arranged on a first side of one of a front surface and a back surface of a target object passing through the transport duct;

a gas flow resistor arranged on a second side and having at least one partition wall; and a doctor blade to prevent gas entry arranged between the transport roll and the roll cover.

9. A transport duct for an apparatus for an active energy beam irradiation, comprising:

a transport roll and a roll cover at least partially covering the transport roll, both arranged on a first side of one of a front surface and a back surface of a target object passing through the transport duct;

a gas flow resistor arranged on a second side and having a cover shared to conform with the shape of the transport roll and constructed to cover the target object and the transport roll; and a doctor blade to prevent gas entry arranged between the transport roll and the roll cover.

10. A transport duct for an apparatus for an active energy beam irradiation, comprising:

a transport roll and a roll cover at least partially covering the transport roll, both arranged on a first side of one of a front surface and a back surface of a target object passing through the transport duct;

a gas flow resistor arranged on a second side and having a nip roll and a roll cover covering the nip roll; and a doctor blade to prevent gas entry arranged between the transport roll and the roll cover.

* * * * *